L. L. GRIBBLE.
BLACKBOARD.
APPLICATION FILED AUG. 7, 1916.
1,237,636.
Patented Aug. 21, 1917.
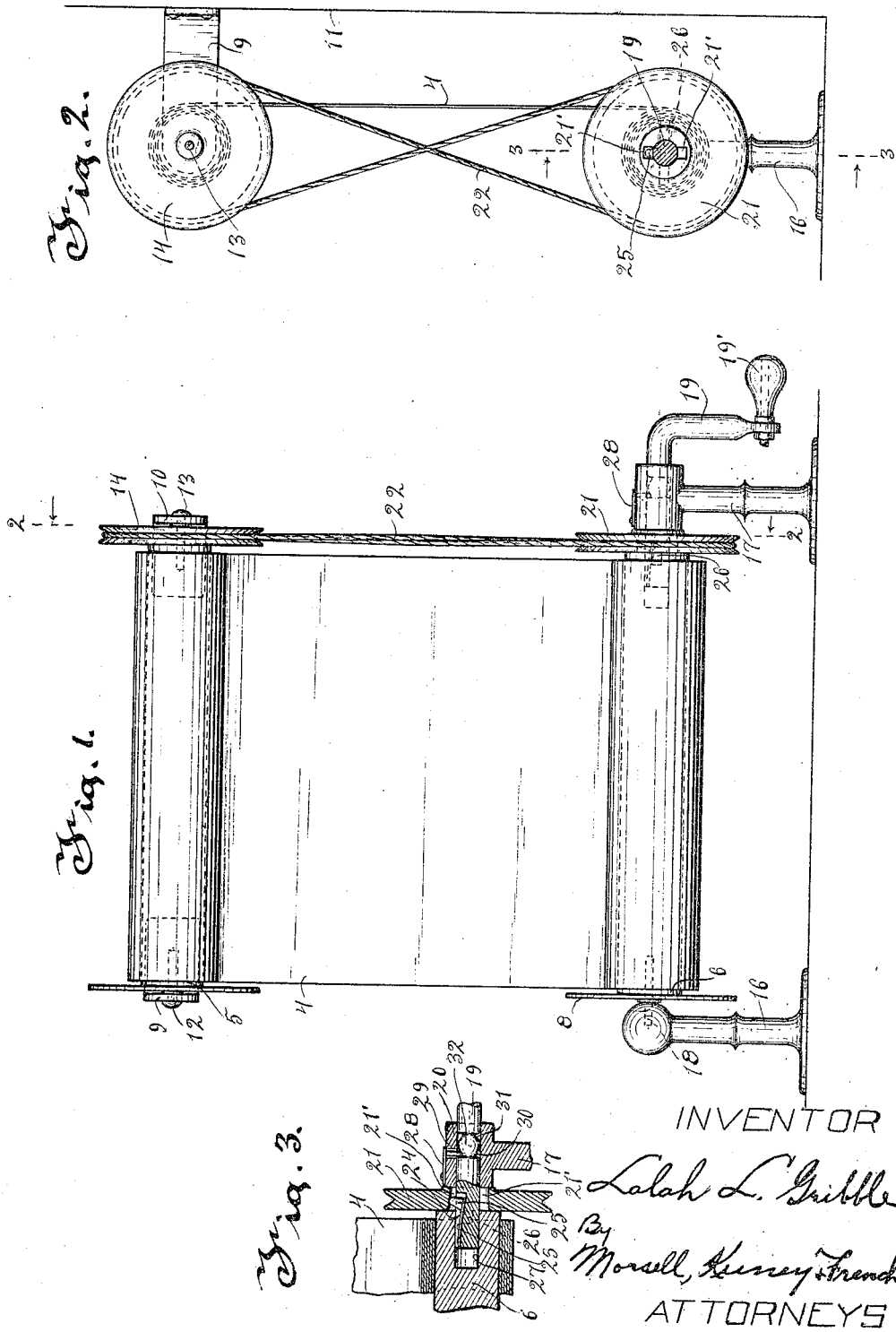
INVENTOR
Lalah L. Gribble
By
Morsell, Kinney & French,
ATTORNEYS

UNITED STATES PATENT OFFICE.

LELAH L. GRIBBLE, OF MINERAL POINT, WISCONSIN.

BLACKBOARD.

1,237,636.  Specification of Letters Patent.  Patented Aug. 21, 1917.

Application filed August 7, 1916. Serial No. 113,466.

*To all whom it may concern:*

Be it known that I, LELAH L. GRIBBLE, a citizen of the United States, and resident of Mineral Point, in the county of Iowa and State of Wisconsin, have invented new and useful Improvements in Blackboards, of which the following is a description, reference being had to the accompanying drawings, which are a part of this specification.

The invention relates to blackboards.

The invention is more particularly designed to provide a blackboard in the form of a roll which may be moved by the teacher to display the daily lessons so that each day's lesson may be printed or written on the roll and the roll moved to position by the teacher when any particular lesson is desired, the roll being moved by the teacher through a crank which is always turned in the same direction.

The invention is further designed to provide a driving mechanism for the blackboard roll in which the crank is always turned in the same direction while the roll itself may be turned in opposite directions through a clutch connection with the crank.

The invention further consists in the several features hereinafter set forth and more particularly defined by claims at the conclusion hereof.

In the drawings:

Figure 1 is a front view of the device embodying the invention;

Fig. 2 is a section taken on the line 2—2 of Fig. 1;

Fig. 3 is a section taken on the line 3—3 of Fig. 2.

The device comprises a blackboard roll 4 mounted on upper and lower rollers 5 and 6 respectively, means for supporting each of said rollers, and means for operating the rollers to move the roll 4 into the desired position.

The upper roller 5 is of usual construction and is provided at one end with a circular guide plate 7 and the lower roller 6 is provided with a similar plate 8. The means for supporting the upper roller 5 comprises a pair of brackets 9 and 10 which are adapted to be secured to any suitable support as the wall 11 shown in Fig. 2 and in which pins 12 and 13 are pivotally mounted, said pins also being secured to the ends of the roller 5. A driving pulley 14 is interposed between the end of the roller 5 and the bracket 10 and secured to the end of the said roller to form a guide similar to the guide plate 7.

The means for supporting the lower roller 6 comprises uprights 16 and 17 to which the lower roller is pivotally secured. At the end of the roller 6 adjacent the plate 8 the said roller is pivotally secured to the upright 16 by a pin 18 journaled in said upright. The roller 6 is pivotally secured to the upright 17 by means of a slidable and revoluble crank shaft 19 which is journaled in a bearing 20 at the upper end of the upright 17 and provided with a handle 19'. A pulley 21 is loosely mounted on the longitudinally movable crank 19 adjacent to one end of the roller 6 and serves as a guide similar to the plate 8.

The means for operating the rollers to move the roll 4 into the desired position comprises the pulleys 14 and 21, a driving connection between said pulleys consisting of a cross-belt 22 and a driving connection between the crank 19 with the pulley 21 or with the lower roller 6.

This driving connection between the crank 19 and the pulley 21 and the roller 6 consists of a clutch for either locking the pulley 21 to the crank 19 or the lower roller 6 to the crank 19. This clutch consists of a spring clutch member 23 secured to the inner end of the crank 19 and mounted in a recess 24 therein and having a projecting end 25 which is adapted to engage notches 21' in the pulley 21 to lock the pulley to said crank or to engage roller 6. The means for locking the lower roller 6 to the crank 19 consists of the clutch 23 with the projecting finger 25 which is adapted to be moved into engagement with either of two oppositely disposed notches 26 in the end of the roller 6 when said crank is moved inwardly within the bore 27 in the end of the roller 6. In order that the clutch 23 may be held in engagement with either the pulley 21 or the roller 6 means are provided for preventing end-wise movement of the crank 19 with respect to the upright 17. This means consists of a spring pressed finger 28 which projects downwardly through an aperture 29 in the bearing 20 and is adapted to engage with either of a pair of grooves 30 and 31 formed in the crank 19 at the ends of a spherical portion 32 formed in the shaft 19. The spherical portion 32 permits the shaft 19 to be moved either inwardly or outwardly so that the spring pressed finger 28 may engage either the groove 30 or the groove 31.

The operation of the device is as follows: When it is desired to move the roll 4 upwardly the crank 19 is moved outwardly so that the spring pressed finger 28 engages in the groove 30 under which conditions the spring pressed clutch 23 engages in one of the notches 21' in the pulley 21 and locks said pulley to said crank so that on a clock-wise rotation of the crank 19 the upper roll 5 will through the pulley 21, belt 22 and pulley 14 be rotated in a counter-clock-wise direction to wind the roll 4 upon the upper roller until the operator has reached the desired part of the board which he wishes to display to the pupils for the lesson of the day. When it is desired to move the roll 4 downwardly the crank 19 is pushed inwardly until the finger 28 engages in the groove 31, the spherical portion 32 of the crank 19 permitting the movement of the finger 28 from the groove 30 and into the groove 31. Under these conditions the spring pressed clutch 23 is moved inwardly and engages with one of the notches 26 in the roll 6 and on a clock-wise rotation of the crank 19, which it will be observed is the same direction as is required to move the roll upwardly, the lower roller is rotated in a clock-wise direction and the roll 4 is moved downwardly and wound up on the lower roll to display the desired lesson.

It will thus be apparent that the driving mechanism for the roll permits said roll to be moved upwardly or downwardly upon its carrying rollers while the operating crank is always rotated in the same direction.

The invention thus exemplifies a simple and efficient construction of blackboard roll which is well adapted for the purpose desired.

What I claim as my invention is:

1. In a device of the character described, the combination of a blackboard roll, upper and lower supporting rollers for said roll, a pulley carried by the upper roll, a revoluble shaft slidably mounted in the lower roller, a pulley loosely mounted on said shaft, a cross-belt connecting said loose pulley with the pulley carried by the upper roller, said loose pulley and lower roller having notches therein, said shaft having a recess therein, a spring pressed finger mounted in the recess in said shaft and adapted to engage the notch in said loose pulley or the notch in said roller to connect the shaft in driving relation therewith, and means for securing said shaft against endwise movement when it is connected to either said loose pulley or said lower roller.

2. In a device of the character described, the combination of a blackboard roll, upper and lower supporting rollers for said roll, a pulley carried by the upper roller, a revoluble cranked shaft slidably mounted in the lower roller, a supporting bearing for said shaft, a pulley loosely mounted on said shaft, a cross-belt connecting said loose pulley with the pulley carried by the upper roller, said loose pulley and lower roller having notches therein, said shaft having a recess therein, a spring pressed finger mounted in the recess in said shaft and adapted to engage the notch in said loose pulley or the notch in said roller to connect the shaft in driving relation therewith, said shaft having annular grooves therein and a spherical portion between said grooves, and means for securing said shaft in different lateral positions comprising a spring pressed pin mounted in said supporting bearing and adapted to seat in either of said annular grooves.

In testimony whereof, I affix my signature.

LELAH L. GRIBBLE.

Copies of this patent may be obtained for five cents each, by addressing the "Commissioner of Patents, Washington, D. C."